United States Patent [19]

Camirand et al.

[11] 4,295,333

[45] Oct. 20, 1981

[54] MELTING ICEBERGS TO PRODUCE FRESH WATER AND MECHANICAL ENERGY

[75] Inventors: Wayne M. Camirand, Albany; John M. Randall, El Cerrito; Earl Hautala, Martinez, all of Calif.

[73] Assignee: The United States of America as represented by the Secretary of Agriculture, Washington, D.C.

[21] Appl. No.: 56,652

[22] Filed: Jul. 11, 1979

[51] Int. Cl.$^3$ .............................................. F03G 7/04
[52] U.S. Cl. .................................................. 60/641.6
[58] Field of Search ............................ 60/641, 641 G

[56] References Cited

U.S. PATENT DOCUMENTS

| | | | |
|---|---|---|---|
| 3,967,449 | 7/1976 | Beck | 60/641 |
| 4,055,145 | 10/1977 | Mager | 60/641 X |
| 4,103,493 | 8/1978 | Schoenfelder | 60/641 |
| 4,166,363 | 9/1979 | Mougin | 60/641 |
| 4,186,311 | 1/1980 | Humiston | 60/641 X |
| 4,189,924 | 2/1980 | La Coste | 60/641 |

*Primary Examiner*—Robert G. Nilson
*Attorney, Agent, or Firm*—M. Howard Silverstein; David G. McConnell; Theodore J. Leitereg

[57] ABSTRACT

Fresh water and mechanical energy are obtained from melting of icebergs. Warm surface seawater is contacted with a fluid, which is vaporized. The resulting vapor is used to generate mechanical energy and then is condensed by contacting it with cold melt water from the iceberg. The fluid is regenerated with a concomitant elevation in the temperature of the melt water. The warmer melt water is cycled to the body of the iceberg to facilitate its melting and produce additional cold melt water, which is apportioned as fresh water and water cycled to condense the aforesaid vapor.

In an alternate embodiment of the invention warm seawater is evaporated at reduced pressure. Mechanical energy is generated from the vapor, which is then condensed by direct and intimate contact with cold melt water from the iceberg. The resultant fresh water is a mixture of condensed vapor and melt water from the iceberg and has a temperature greater than the cold melt water. This fresh water mixture is contacted with the body of the iceberg to further melt it; part of the cold melt water is separated as fresh water and the remainder is cycled for use in condensing the vapor from the warm surface seawater.

24 Claims, 5 Drawing Figures

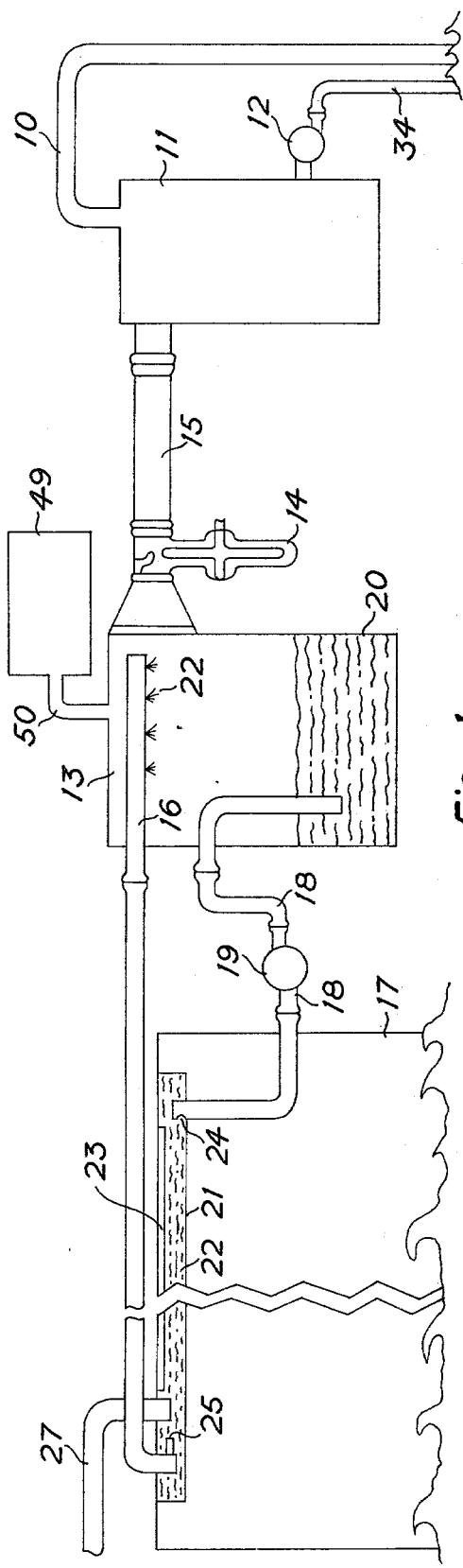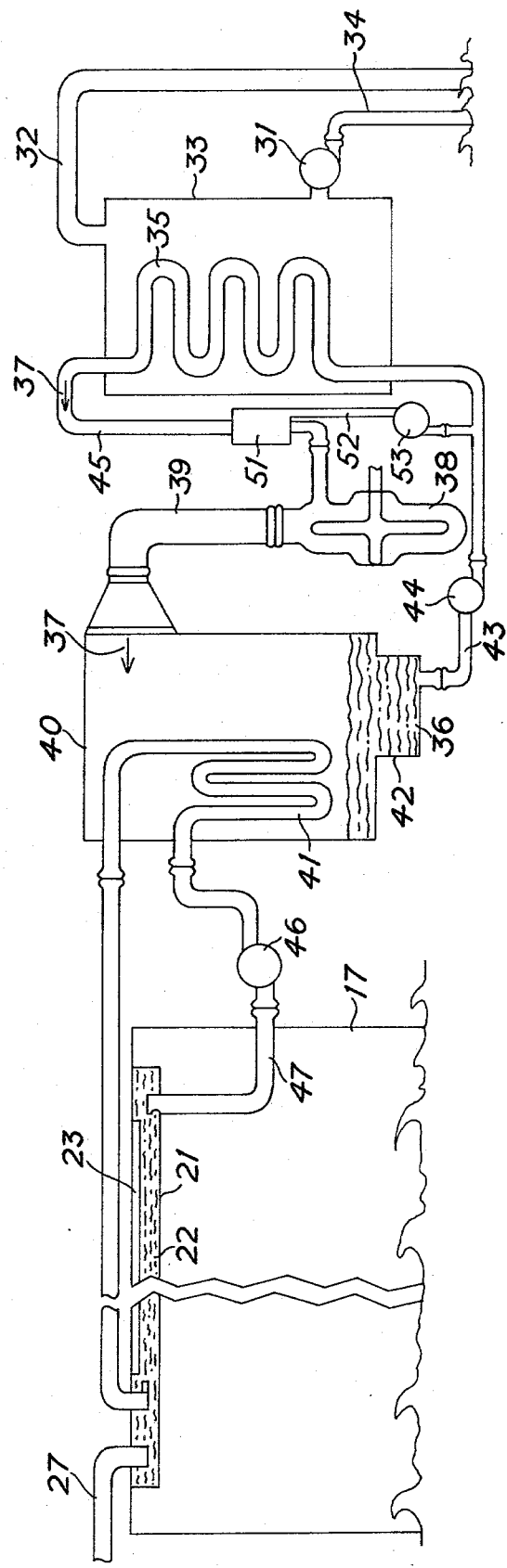
Fig. 1
Fig. 2

MELTING ICEBERGS TO PRODUCE FRESH WATER AND MECHANICAL ENERGY

BACKGROUND OF THE INVENTION

1. Field of the Invention

This invention relates to and has among its objects the provision of novel methods and apparatus for melting icebergs. It is a particular object of the invention to provide both fresh water and mechanical energy from the melting of icebergs. Further objects of the invention will be evident from the following description wherein parts and percentages are by weight unless otherwise specified.

2. Description of the Prior Art

The most productive agricultural regions are arid regions because they are rich in solar energy and their soils are high in nutrients. However, these agriculturally productive arid regions must obtain irrigation water from humid areas. To significantly extend crop acreage, therefore, it is necessary to expand irrigation.

One solution proposed for providing an inexpensive source of irrigation water for arid regions is the use of melt water from icebergs. The annual yield of fresh water from icebergs is estimated at 12,000 cubic kilometers, the total world iceberg accumulation being six times this amount. Annual yield of fresh water from Antartic icebergs alone would provide sufficient water to irrigate about 90 million hectares or 40% of currently irrigated land.

A number of modes of iceberg transport have been disclosed: *Science Digest*, Vol. 39, page 1 (1956); *Water Resources Journal*, Vol. 100, page 1 (1974); *Bull. Atom. Scient.*, Vol. 29, page 35 (1973); *Journal of Glaciology*, Vol. 12, page 207 (1973); *Ocean Industry*, Vol. 8, page 28 (1973); and *New Scientist*, Vol. 75, page 11 (1977). It has been calculated that icebergs could be delivered to the United States at a cost that would make them highly attractive as a source of both irrigation and drinking water.

The major problem in obtaining water from icebergs in the large expenditure of energy required to melt an iceberg. Indeed, the energy necessary to melt an iceberg is about 2,000 times greater than the energy needed to transport it. Solar energy has been considered, but it is postulated that direct contact of the desert sun of Saudi Arabia on an iceberg would melt only approximately 10 vertical meters of iceberg per year. Another suggestion as an energy source is waste heat from coastal electric power plants. However, this would require bringing an iceberg close to coastal boundaries, which presents some difficulty because of the depth of an iceberg and the necessity for running pipe lines to convey the source of waste heat to the iceberg and the fresh water from the iceberg to the coast.

The oceans of the world represent a vast source of solar energy and the idea of recovering this energy is old in the art, being first proposed in 1881. Ocean Thermal Energy Conversion (hereinafter referred to as OTEC) has been described recently. Basically, OTEC involves converting the difference in temperatures of warmer surface sea water and cooler deep sea water into mechanical energy (*Solar Energy*, Vol. 18, pages 81–92 (1976)). In closed cycle OTEC a fluid, such as ammonia or a halogenated hydrocarbon, is heated with warm seawater through a heat exchanging boundary to vaporize it. After expansion through a turbine, the vapor is condensed on a heat exchanging surface with cold seawater (*Mechanical Engineering*, Vol. 88, page 41, (1966); *Chem. Eng. News*, Vol. 54, page 19 (1976); and *Solar Energy*, Vol. 20, page 259 (1978)). Open cycle OTEC (U.S. Pat. No. 3,967,449) is a simpler concept than closed cycle OTEC since cool seawater is employed directly to condense vaporized warm seawater. However, even open cycle OTEC has the disadvantage that heat exchangers are required in order to produce fresh water from seawater.

SUMMARY OF THE INVENTION

The invention described herein provides means for supplying low-cost energy for melting of icebergs to yield fresh water and mechanical energy with the avoidance of the aforementioned problems. In the present method warm surface seawater is employed to convert a liquid or fluid to a working vapor from which mechanical energy is generated. Then, the vapor is contacted with cold melt water from the iceberg to condense the working vapor to the liquid state. The temperature of the aforesaid cold melt water is raised by the conversion of the vapor to liquid, and the resulting warmer water is cycled to the iceberg to facilitate melting thereof and produce additional cold melt water. A portion of this cold melt water is separated and removed and the remainder is employed to condense the working vapor as described above.

An apparatus in accordance with the invention comprises means for treating warm surface seawater to produce a vapor from a liquid or fluid, said means communicating with means for generating mechanical energy from the vapor. The latter means further communicates with means for contacting the vapor with cold melt water from an iceberg to condense the vapor and regenerate the working fluid thereby raising the temperature of the cold melt water. Means for contacting the warmer water with the body of the iceberg to produce cold melt water cooperates with the latter means. The present apparatus further includes means for separating and removing a portion of the cold melt water and means for recycling a portion of this cold melt water to condense the aforesaid vapor and produce working fluid.

The method and apparatus of the invention has the advantage of substantially reducing the expense of money and energy in obtaining fresh water and mechanical energy from icebergs. Furthermore, cumbersome procedures found in prior art approaches are avoided in the instant invention.

In an alternate and preferred embodiment of the present invention the liquid or fluid is warm surface seawater, which is vaporized and treated to obtain mechanical energy therefrom, and then vapor is condensed by direct and intimate contact with cold melt water from an iceberg yielding a mixture of iceberg melt water and condensed vapor having a temperature greater than the cold melt water. The warmer mixture is then cycled to the iceberg.

This particular embodiment of the invention has a number of advantages over the embodiments wherein a liquid or fluid other than warm seawater is employed. The primary advantage of this embodiment is that fresh water can be obtained without employing a heat exchanging surface. Vaporized seawater can be condensed by intimate mixing with cold iceberg melt water resulting in a fresh water mixture free of salt. In the method of U.S. Pat. No. 3,967,449, fresh water free of salt can be produced only by employing a heat exchanger. The method and apparatus disclosed in the patent yields a mixture containing salt water, which would be unfit, without further purification, for drinking, irrigation, and the like.

An apparatus in accordance with the aforesaid preferred embodiment comprises means for evaporating warm surface seawater to produce water vapor communicating with means for generating mechanical energy from said vapor and means for condensing said vapor by contacting it directly and intimately with cold melt water from an iceberg to produce fresh water comprising a mixture of condensed vapor and melt water from the iceberg having a temperature greater than the cold melt water. Also included in the above apparatus are means for contacting the warmer fresh water mixture with the body of the iceberg to melt it, means for separating a portion of the cold melt water as fresh water, and means for cycling the remainder of the cold melt water to condense the aforementioned vapor.

BRIEF DESCRIPTION OF THE DRAWINGS

FIG. 1 is a diagrammatic sketch depicting one embodiment of the present invention.

FIG. 2 is a diagrammatic sketch depicting an alternate embodiment of the instant invention.

DESCRIPTION OF THE PREFERRED EMBODIMENTS

Figure 3:
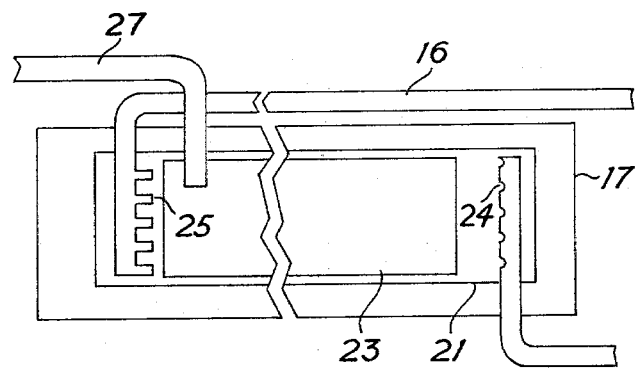
FIG. 3 is a diagrammatic sketch of part of the present invention depicting one embodiment for melting an iceberg.

The invention is next described in detail with reference to the annexed drawings. Referring to FIG. 1, one end of inlet pipe 10 communicates with warm surface seawater and the other end of 10 is secured to evaporator 11. Water exhaust pump 12 is attached to outlet pipe 34 between 11 and the seawater. Eleven may take the form of a conventional spray evaporator or film evaporator; other types of evaporative units will be suggested to those skilled in the art. Evaporator 11 is connected to condensing unit 13, turbine 14 by means of pipe 15, and vacuum pump 49 by means of pipe 50. Unit 13 includes pipe 16 with perforations at one end which allow a spray (or thin film) of cold melt water to be projected in a generally downward direction. The other end of 16 communicates with iceberg 17 as does one end of pipe 18, connected to pump 19 and condensing unit 13.

In operation vacuum pump 49 evacuates units 13 and 11 and pipe 15 causing warm surface seawater to flow by means of 10 into evaporator 11 wherein it is vaporized under reduced pressure usually about 5–25 millimeters (mm) of mercury. The vapor passes into turbine 14 and generates mechanical energy because the vapor is expanded since the pressure on the condensing unit side of the turbine (6–10 mm of mercury) is less than on the evaporator side. From turbine 14 the vapor enters unit 13 wherein it contacts cold melt water from iceberg 17 delivered, as a spray or film, by pipe 16, which is perforated in that portion inside unit 13. The vapor is condensed to the liquid state upon contact with the cold melt water and the mixture of melt water from the iceberg and condensed vapor, i.e., fresh water 20, is pumped by 19 through 18 to iceberg 17. It is a characteristic of fresh water mixture 20 that its temperature is greater than that of the cold melt water from 17 because of the heat generated during the condensation.

Figure 4:
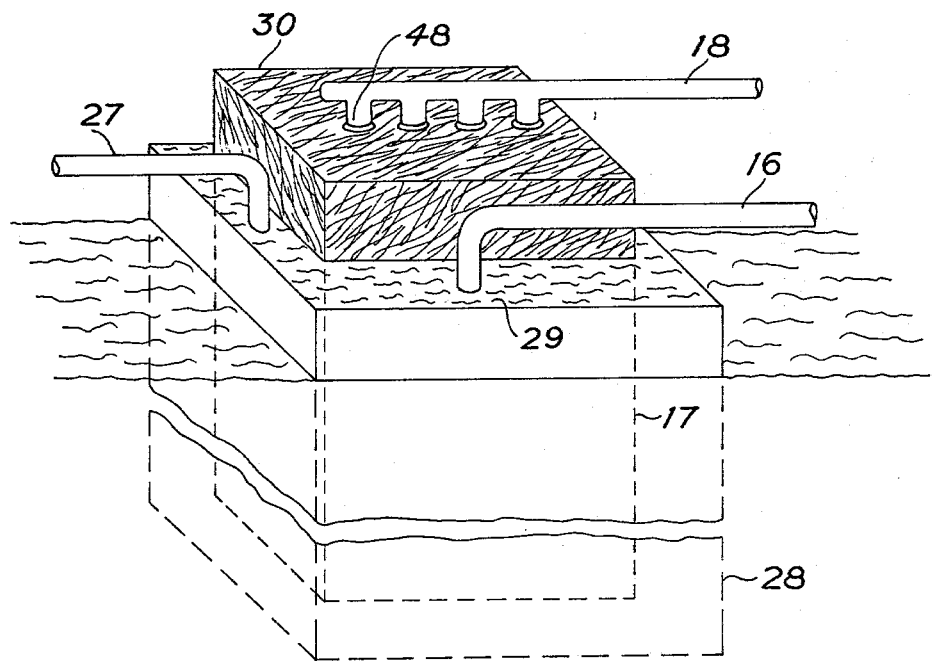
FIG. 4 is a three dimensional sketch of part of the present invention depicting another embodiment for melting an iceberg.
Figure 5:
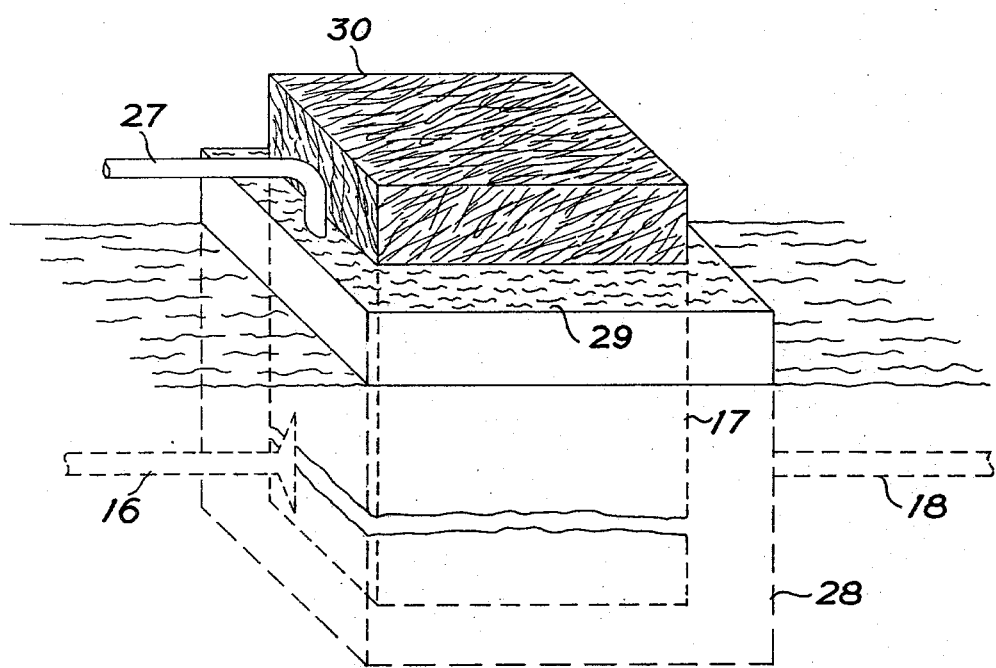
FIG. 5 is a three dimensional sketch of part of the present invention depicting a third embodiment for melting an iceberg.

Fresh water 20 is contacted with iceberg 17 to facilitate melting thereof. Three ways in which this contact is realized are depicted in FIGS. 3–5. Referring to FIG. 3 a pool or lake 21 is formed on the top of 17 and contains cold melt water 22. Floating insulating means 23, e.g., reflective plastic sheets equipped with air pockets, thin, light pieces of polyurethane foam, and the like, covers a substantial portion of the top of lake 21. The end of pipe 18 which communicates with 17 contains outlet holes 24, which allow fresh water 20 to enter lake 21 at one end. Since the temperature of 20 is greater than 22, melting of the iceberg occurs and the amount of cold melt water from the iceberg in lake 21 increases. Pipe 16 with inlet tubes 25 is situated at the end of lake 21 opposite the end housing pipe 18. Cold melt water from 21 passes to condensing unit 13 by means of pipe 16. Also located at this end of 21 is pipe 27, which carries away a portion of 22 for use as fresh water for drinking, irrigation, etc.

In the embodiment depicted in FIG. 4 insulating encirclement 28, e.g., double layer plastic sheet equipped with air pockets, sheets of foamed polymer, and the like, covers all but the top portion of 17. In effect 28 forms a moat 29 around the iceberg which contains cold melt water from iceberg. Pipe 18 has outlet tubes 48 that project fresh water 20 over the top of 17, shielded by insulating shroud 30, again an insulating polymer sheet, which also serves the function of reducing the head loss of water flow over the iceberg and, therefore, should be airtight. The elevated temperature of 20 facilitates melting of the iceberg and cold melt water 22 collects in 29 from which it is cycled to 13 by means of 16 with a portion removed as fresh water through pipe 27.

FIG. 5 illustrates an embodiment similar to that of FIG. 4. In FIG. 5 pipe 18 delivers warm fresh water 20 to one side of iceberg 17. Cold melt water 22 is removed also from one of the sides by means of pipe 16, which carries 22 to condensing unit 13. As in the FIG. 4 embodiment pipe 27 removes a portion of cold melt water 22 as fresh water. Alternately, 22 may be removed from the bottom side of the iceberg; thus the term side as applied above refers to both vertical sides and the bottom side.

It is also within the compass of the invention to combine the embodiments of FIGS. 3 and 5 and thus melt the iceberg both from the top and from the sides and bottom as well.

An alternate embodiment of the present invention is depicted in FIG. 2. Warm surface seawater flows through pipe 32 into an evaporative heat exchanger 33 comprising a chamber, outlet pipe 34 with water exhaust pump 31 and standard heat exchanger 35 containing fluid 36. (In an alternate embodiment warm surface seawater is first vaporized and the vapors are passed into chamber 33.) The boiling point of 36 should be the same as the temperature of the warm surface seawater or below. Fluids that can be employed, by way of illustration, are liquid ammonia, liquid propane, liquid fluorinated and chlorinated hydrocarbons, and the like. Fluid 36 is vaporized by warm surface seawater to give working vapor 37, which is passed through demister 51, which removes water from the vapor, and then through turbine 38 into pipe 39 and then into condensing unit 40. As in the FIG. 1 embodiment, the pressure on the condensing unit side of the turbine is less than that on the vaporizer side and the difference in pressure results in the generation of mechanical energy as 37 passes (expands) through turbine 38. Vapor 37 entering 40 is converted to fluid 36 on contact with heat exchanging unit 41 filled with cold melt water 22 from the iceberg. The condensed fluid is collected in reservoir 42, comprising part of unit 40. From 42 fluid 36 is pumped along pipe 43 by means of circulation pump 44 to heat exchanger 35 by means of pipe 45. Cold melt water from 17 is pumped through 41 by means of pump 46. After passing through 41 the temperature of 22 is raised because of the conversion of vapor 37 into fluid 36. Pump 46 conveys the warmer melt water along pipe 47 to iceberg 17 where it is employed to facilitate melting of the iceberg. It should be evident that the manner of collecting and removing cold melt water 22 and of receiving warmer melt water for melting of the iceberg is similar to that described above and depicted in FIGS. 1, 3, and 4.

The effectiveness of the method and apparatus of the invention is evident from the following discussion with reference to FIGS. 1 and 3. The size of an iceberg considered economically feasible to tow is approximately one billion cubic meters. It is known that turbulent flow greatly enhances heat transfer rates. If it is assumed that the iceberg is 1 kilometer (km) wide, 5 km long, and 200 m deep, that the depth of lake 21 at the point of tubes 25 in pipe 16 is one meter, that the rate of flow of cold melt water in pipe 16 to condensing unit 13 is 1000 cubic meters per second that the velocity (V) (for turbulent flow) of lake 21 at or near tube 25 is one meter per second, and that the temperature of fresh water 20 is 6° C., then the point at which flow becomes turbulent in the instant case can be calculated from the equation—

$$R_e = LV\rho/\mu$$

wherein $R_e$ is Reynold's number, L=length required to produce turbulent flow, V=velocity, p=density, and $\mu$=viscosity. It is further known that flow across a plane becomes completely turbulent when $R_e = 3.7 \times 10^6$ or greater. Thus, in the above situation flow becomes completely turbulent at a point 5.6 meters from the water outlet at 24. Since the iceberg is 5000 meters long, flow can be considered essentially turbulent over the entire length of the iceberg.

The depth of the lake at outlet 24 to produce a velocity of one meter per second at or near intake tube 25 can be calculated from the Fanning equation—

$$F = 4fLV^2/2gD$$

wherein f is the Fanning friction factor, D=4S/P or four times the hydraulic radius, S=cross-sectional area of fluid flow=$10^7$ cm$^2$, and P=wetted perimeter=$10^5$ cm. It is known that Reynold's number is $2.5 \times 10^6$ for D=400 cm, $f = 2.5 \times 10^{-3}$ and $F = 6.34 \times 10^{-1}$ m. Thus, for the above situation the depth of the lake at 24 must be 1.64 m to produce a velocity (V) of 1 meter per second in the vicinity of tube 25.

The heat transfer factor (j) is defined as—

$$j = (h/c_p v\rho)(C_p\mu/k)^{\frac{2}{3}} = S_t Pr^{\frac{2}{3}}$$

wherein $S_t$=Stanton number, Pr—Prandtl number, k—thermal conductivity, $c_P$=specific heat, h—heat transfer coefficient. Since, $$S_t = (S)(t_1 - t_2)/\Delta tm(A)$$

$$j = (S)(t_1 - t_2)(Pr^{\frac{2}{3}})/\Delta tm(A)$$

wherein $t_2$=temperature of water leaving system; tm—mean temperature difference across the film; and A=surface area over which fluid flows. For water at about 5° C., Pr=11.0, and $Pr^{\frac{2}{3}}=4.95$. For conditions at the chilled water end of the iceberg, i.e., at 25, it is known that $Re = 3.29 \times 10^9$ and $j = 4.50 \times 10^{-4}$. For $\Delta tm = (t_1 - t_w)/2 + (t_2 - t_w)/2$, where $t_w$=temperature of the wetted wall (ice at 0° C.), $t_2 = 3.83°$ C. Thus, the temperature of the water to be pumped back to condensing unit 13 is 3.83° C., and the total heat flow (Q) from the condenser water to the iceberg is $9.08 \times 10^9$ Joules per second (J/s). The heat of fusion of ice is $30.1 \times 10^7$ Joules per cubic meter (J/m$^3$), so the melting rate is 30.1 m$^3$ of ice per second. For a total iceberg volume of $10^9$ m$^3$, the time required to melt the aforesaid iceberg would be 1.05 years and the daily production of water for agricultural or other use would be 2,210,000 m$^3$ (584,000,000 gal).

For the assumed rate of flow of water in pipe 16, the quantity of heat removed from the water vapor or from the condenser working fluid is the same as the heat available to melt in, namely, $9.0 \times 10^9$ J/s, assuming no change in the temperature of the water from iceberg to the condenser or from the condenser back to the iceberg. Thus, the total energy available to melt the iceberg is 9080 Megawatts (Mw). For a conservative estimate of efficiency of the above system of 2%, the actual power output available in the above method is 182 Mw or enough electrical energy to supply the entire power requirements of about 18,000 people for a one year period.

The amount of cold melt water that can be removed from the iceberg for use as fresh water can be determined as follows. A certain amount of cold melt water must be collected in a "lake" or "reservoir" from which it is cycled to condense vapor (either water vapor or working fluid vapor). Once a lake or reservoir of sufficient size is obtained, cold melt water can be removed as fresh water at the rate at which the iceberg melts. For an iceberg of the aforesaid dimensions, about 25 cubic meters of water could be removed every second.

It should be noted that a temperature differential of about 15° C., between the warm surface seawater and the cold melt water from the iceberg is necessary in order that the instant method operate successfully. Generally, the warm surface seawater will have a temperature in the range of about 15°–30° C., and the cold melt water, in the range of 2°–15° C.

Having thus described the invention, we claim:

1. A method of melting an iceberg to produce fresh water in an amount greater than that available from the melting of the iceberg and mechanical energy, which comprises—
    (a) evaporating warm surface seawater to produce water vapor,
    (b) generating mechanical energy from said vapor,
    (c) condensing said vapor by contacting it directly and intimately with cold melt water from the iceberg to produce a mixture of condensed vapor and melt water from the iceberg, said mixture having a temperature and a volume greater than the cold melt water alone, (d) contacting the so-produced mixture with the body of the iceberg to melt the iceberg and produce cold melt water, said contact being made in such a manner as to produce turbulent flow of the cold melt water, (e) separating a portion of the so-produced mixture and cold melt water as fresh water produce, and (f) cycling the remainder of the so-produced mixture and cold melt water for direct and intimate contact with said vapor, the amount of said fresh water produced being greater than the amount of cold water obtained from melting of the iceberg.

2. The method of claim 1 wherein the warm surface seawater is evaporated under reduced pressure.

3. The method of claim 2 wherein the reduced pressure is about 5–25 millimeters of mercury.

4. The method of claim 1 wherein mechanical energy is generated from said vapor by passing said vapor through a turbine.

5. The method of claim 4 wherein the vapor is expanded through the turbine.

6. A method of melting an iceberg to produce fresh water and mechanical energy, which comprises—

(a) evaporating warm surface seawater to produce water vapor, (b) generating mechanical energy from said vapor, (c) condensing said vapor by contacting it directly and intimately with cold melt water from the iceberg to produce fresh water comprising a mixture of condensed vapor and melt water from the iceberg, said mixture having a temperature greater than the cold melt water, said contacting comprising— forming a lake on top of the iceberg, depositing said fresh water mixture at one end of said lake, separating a portion of cold melt water from the lake, and cycling the remainder of the so-produced cold melt water from the other end of said lake for direct and intimate contact with said vapor, (d) contacting the so-produced fresh water mixture with the body of the iceberg to melt the iceberg and produce cold melt water, (e) separating a portion of the so-produced cold melt water as fresh water produce, and (f) cycling the remainder of the so-produced cold melt water for direct and intimate contact with said vapor.

7. The method of claim 6 wherein said fresh water mixture is contacted with the body of the iceberg by projecting said melt water over the top of the iceberg and collecting the cold melt water in a container encircling all but the top portion of the iceberg, said top portion of the iceberg being covered by an airtight insulating shroud.

8. The method of claim 6 wherein said fresh water mixture is contacted with the body of the iceberg by—

(a) introducing said fresh water mixture into the side of a container encircling all but the top portion of the iceberg, said container collecting the cold melt water, (b) separating a portion of the so-collected water from the container, and (c) cycling the remainder of the so-collected water from the container for direct and intimate contact with said vapor.

9. The method of claim 6 wherein said fresh water mixture is contacted with the body of the iceberg by—

(a) forming a lake on top of the iceberg, (b) depositing said fresh water mixture at one end of said lake, (c) separating a portion of cold melt water from the lake, (d) cycling the remainder of the so-produced cold melt water from the other end of said lake for direct and intimate contact with said vapor, (e) introducing said fresh water mixture into the side of a container encircling all but the top portion of the iceberg, said container collecting the cold melt water, (f) separating a portion of the so-collected water from the container, and (g) cycling the remainder of the so-collected water from the container for direct and intimate contact with said vapor.

10. A method of melting an iceberg to produce fresh water and mechanical energy which comprises—

(a) contacting warm surface seawater with a fluid to convert said fluid to a vapor, (b) generating mechanical energy from said vapor, (c) condensing said vapor by contacting it with cold melt water from the iceberg to regenerate said fluid thereby raising the temperature of said melt water to produce warmer melt water, (d) contacting said warmer melt water with the body of the iceberg in such a manner as to produce turbulent flow which transfers heat to further melt the iceberg and further produce cold melt water, (e) separating a portion of the so-produced cold melt water as fresh water, and (f) cycling the remainder of the so-produced cold melt water for contact with said vapor.

11. The method of claim 10 wherein the fluid has the characteristic of being a vapor at the temperature of the warm surface seawater.

12. The method of claim 11 wherein the fluid is liquid ammonia.

13. The method of claim 11 wherein the fluid is a liquid halogenated hydrocarbon.

14. The method of claim 10 wherein mechanical energy is generated from said vapor by passing said vapor through a turbine.

15. The method of claim 14 wherein the vapor is expanded through the turbine.

16. The method of claim 10 wherein said cold melt water from the iceberg and said fluid are contacted on opposite sides of a heating exchanging surface.

17. The method of claim 10 wherein said warmer melt water is contacted with the body of the iceberg by—

(a) forming a lake on top of the iceberg, (b) depositing said warmer melt water at one end of said lake in such a manner as to produce turbulent flow in said lake to transfer heat to further melt said iceberg and further produce cold melt water, (c) separating a portion of cold melt water from the lake, and (d) cycling the remainder of the so-produced cold melt water from the other end of said lake for contact with said vapor.

18. The method of claim 10 wherein said warmer melt water is contacted with the body of the iceberg by projecting said melt water over the top of the iceberg and collecting the cold melt water in a container encircling all but the top portion of the iceberg, said top portion of the iceberg being covered by an insulating shroud.

19. The method of claim 10 wherein said warmer melt water is contacted with the body of the iceberg by—
 (a) introducing said warmer melt water into the side of a container encircling all but the cold melt water, said top portion of the iceberg being covered by an insulating shroud,
 (b) separating a portion of the so-collected water from the container, and
 (c) cycling the remainder of the so-collected water from the container for contact with said vapor.

20. The method of claim 10 wherein said warmer melt water is contacted with the body of the iceberg by—
 (a) forming a lake on top of the iceberg,
 (b) depositing said warmer melt water at one end of said lake in such a manner as to produce turbulent flow in said lake to transfer heat to further melt said iceberg and further produce cold melt water,
 (c) separating a portion of cold melt water from the lake,
 (d) cycling the remainder of the so-produced cold melt water from the other end of said lake for contact with said vapor,
 (e) introducing said warmer melt water into the side of a container encircling all but the top portion of iceberg, said container collecting the cold melt water,
 (f) separating a portion of the so-collected water from the container, and
 (g) cycling the remainder of the so-collected water from the container for contact with said vapor.

21. An apparatus for melting an iceberg to produce fresh water in an amount greater than that available from the melting of the iceberg and mechanical energy, which comprises in combination—
 (a) means for evaporating warm surface seawater to produce water vapor,
 (b) means for generating mechanical energy from said vapor,
 (c) means for condensing said vapor by contacting it directly and intimately with cold melt water from the iceberg to produce a mixture of condensed vapor and melt water from the iceberg, said mixture having a temperature and a volume greater than said cold melt water alone,
 (d) means for contacting the so-produced fresh water mixture with the body of the iceberg to melt the iceberg and produce cold melt water, said means producing turbulent flow of the cold melt water,
 (e) means for separating a portion of the so-produced mixture and cold melt water as fresh water, and
 (f) means for cycling the remainder of the so-produced mixture and cold melt water for direct and intimate contact with said vapor,
 the amount of said fresh water produce being greater than the amount of cold water obtained from the melting of the iceberg.

22. The apparatus of claim 21 wherein the means for generating energy from the vapor includes a turbine.

23. An apparatus for melting an iceberg to produce fresh water and mechanical energy, which comprises in combination—
 (a) means for contacting warm surface seawater with a fluid to convert said fluid to vapor,
 (b) means for generating mechanical energy from said vapor,
 (c) means for condensing said vapor by contacting it with cold melt water from the iceberg to regenerate said fluid thereby raising the temperature of said melt water to produce warmer melt water,
 (d) means for contacting said warmer melt water with the body of the iceberg to produce turbulent flow to transfer heat to the iceberg to further melt the iceberg and further produce cold melt water,
 (e) means for separating a portion of the so-produced cold melt water as fresh water, and
 (f) means for cycling the remainder of the so-produced cold melt water to contact it with said vapor.

24. The apparatus of claim 23 wherein the means for generating mechanical energy from the vapor includes a turbine.

* * * * *

UNITED STATES PATENT AND TRADEMARK OFFICE
CERTIFICATE OF CORRECTION

PATENT NO. : 4,295,333
DATED : October 20, 1981
INVENTOR(S) : W.M. Camirand Et Al It is certified that error appears in the above—identified patent and that said Letters Patent is hereby corrected as shown below:

Column 6, line 30, for "in," read --ice--.

Signed and Sealed this

Sixteenth Day of February 1982

[SEAL]

Attest:

GERALD J. MOSSINGHOFF

Attesting Officer    Commissioner of Patents and Trademarks